(12) United States Patent
Stolboushkin

(10) Patent No.: US 9,934,394 B1
(45) Date of Patent: Apr. 3, 2018

(54) NON-RESHARABLE RESOURCE LINKS

(71) Applicant: Google LLC, Mountain View, CA (US)

(72) Inventor: Alexei Stolboushkin, Mountain View, CA (US)

(73) Assignee: Google LLC, Mountain View, CA (US)

(*) Notice: Subject to any disclaimer, the term of this patent is extended or adjusted under 35 U.S.C. 154(b) by 361 days.

(21) Appl. No.: 14/563,716

(22) Filed: Dec. 8, 2014

(51) Int. Cl.
G06F 17/30 (2006.01)
G06F 21/62 (2013.01)

(52) U.S. Cl.
CPC .................. G06F 21/6218 (2013.01)

(58) Field of Classification Search
CPC .................................................. G06F 21/6245
See application file for complete search history.

(56) References Cited

U.S. PATENT DOCUMENTS

2008/0222694 A1* 9/2008 Nakae .................... H04L 63/20
726/1
2011/0258326 A1* 10/2011 Hu ........................ H04L 63/062
709/226

* cited by examiner

Primary Examiner — Hung Q Pham
(74) Attorney, Agent, or Firm — Lerner, David, Littenberg, Krumholz & Mentlik, LLP

(57) ABSTRACT

Provided are methods and systems for generating user-specific resource URIs for resources shared between users on the Internet. The user for whom the link was created and to whom the link was sent may use the link to access a shared resource; however, the link may not be used by any other user to do the same. No data needs to be created and/or stored on the server-side as a result of the link being provided to the user. Instead, by creating this customized/individualized link for the user, the particular user (and only the particular user) is being granted access to the shared resource. The methods and systems provided obviate the need to maintain any configuration data on the server side, thereby protecting against the possibility of the individualized URIs being forged by an intruder, while preserving the need for the accessing user to be authenticated.

19 Claims, 4 Drawing Sheets

NON-RESHARABLE RESOURCE LINKS

BACKGROUND

Internet websites use resource links (e.g., URIs/URLs) to allow users to navigate to specific site resources. For example, a video-sharing website may use URLs of the form "https://www.videosharingwebsite.com/watch?v=<ID>" to navigate users to a specific video associated with the given ID. Users may be directed to such resource links using either direct referral (e.g., a link from another website, from an e-mail message, etc.) or search (e.g., a search of the video-sharing website, a general purpose search using a search engine, etc.).

Frequently, users desire to limit the availability of a particular resource to only select other users or groups of users. In other words, there is oftentimes a need to share some resources in a non-public way.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for providing access to web content to users. More specifically, aspects of the present disclosure relate to generating a non-resharable link for a resource and using the non-resharable link to grant a user access to the resource.

One embodiment of the present disclosure relates to a computer-implemented method comprising: receiving a request for a shared resource; accessing metadata for the resource using a public identifier for the resource; extracting a passphrase associated with the resource; generating a fingerprint for the resource using the extracted passphrase associated with the resource and an ID of a user the resource is being shared with; verifying that the generated fingerprint matches a fingerprint included in a link associated with the request; and providing access to the shared resource.

In another embodiment, providing access to the shared resource includes providing access for a specified amount of time.

In another embodiment, providing access to the shared resource includes granting editing rights with respect to the shared resource.

Another embodiment of the present disclosure relates to a system including one or more processors and a non-transitory computer-readable medium coupled to the one or more processors having instructions stored thereon that, when executed by the one or more processors, cause the one or more processors to perform operations comprising: receiving a request for a shared resource; accessing metadata for the resource using a public identifier for the resource; extracting a passphrase associated with the resource; generating a fingerprint for the resource using the extracted passphrase associated with the resource and an ID of a user the resource is being shared with; verifying that the generated fingerprint matches a fingerprint included in a link associated with the request; and providing access to the shared resource.

Yet another embodiment of the present disclosure relates to one or more non-transitory computer readable media storing computer-executable instructions that, when executed by one or more processors, causes the one or more processors to perform operations comprising: receiving a request for a shared resource; accessing metadata for the resource using a public identifier for the resource; extracting a passphrase associated with the resource; generating a fingerprint for the resource using the extracted passphrase associated with the resource and an ID of a user the resource is being shared with; verifying that the generated fingerprint matches a fingerprint included in a link associated with the request; and providing access to the shared resource.

In one or more other embodiments, the methods and systems of the present disclosure may optionally include one or more of the following additional features: the private passphrase is a random number generated once for the resource and persisted; the private passphrase is based on one or more attributes of the resource; the one or more attributes of the resource are substantially unchangeable and undetectable by other users; providing access to the shared resource includes providing access for a specified amount of time; and/or providing access to the shared resource includes granting editing rights with respect to the shared resource.

It should be noted that embodiments of some or all of the processor and memory systems disclosed herein may also be configured to perform some or all of the method embodiments disclosed above. In addition, embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

Figure 1:
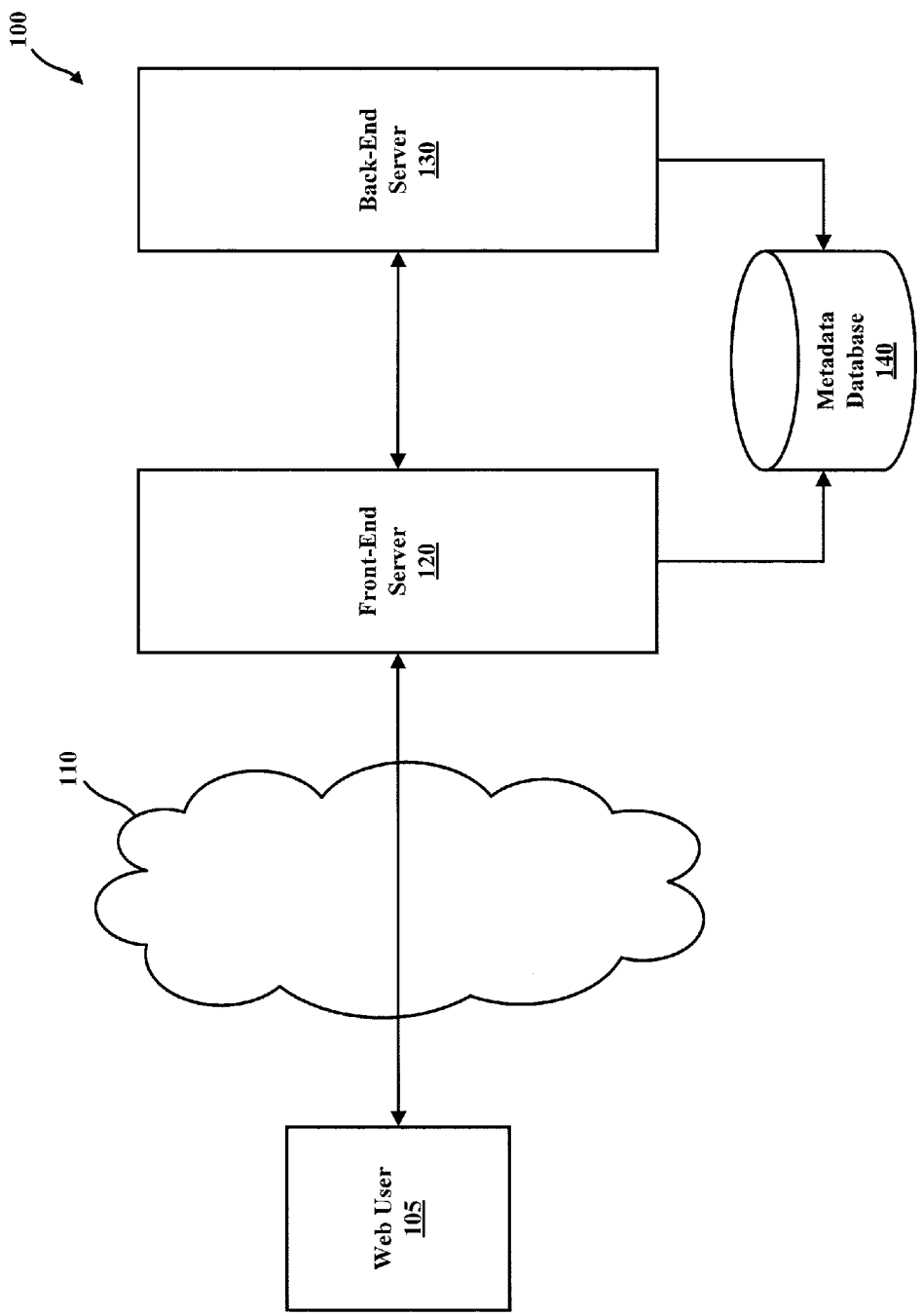
FIG. 1 is a block diagram illustrating an example system and surrounding network environment for generating and exchanging individualized resource links for shared resources according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

As described above, users may desire to limit or restrict the sharing of certain resources (e.g., media content, such as videos, audio files, photographs, images, etc., data content such as documents, as well as other various content accessible through a website) such that the resources are not available/accessible to the general public, but instead are only accessible to specific users or groups of users.

When it is necessary or desirable to limit or restrict the sharing of a resource, two existing approaches are often used.

Under a first existing approach (sometimes referred to as "security by obscurity"), a particular resource is made non-discoverable to other users of the Internet in general, but made accessible to any user provided with a link to the resource. For example, although the resource cannot be discovered through a search query, and thus cannot be accessed through the results of such a query, a user who is given the link to the resource may access the resource directly through the link. For example, a user may upload a non-public video to a video-sharing website. This non-public video would not appear in the results of a search performed on the video-sharing website (or in the results of a general purpose search conducted using a search engine), but users who are provided with a link to the video may be able to watch it. In this manner, however, if the link for the resource is intercepted by an intruder or is re-shared with multiple other users, the link is fully usable by the intruder or any other such users to access the resource.

A second existing approach for limiting the sharing of a resource involves maintaining a server-side access control list (ACL). An ACL is essentially a list of permissions associated with a particular object or resource, where the list specifies which users have access to the resource and, in some instances, what operations each of the users may perform with respect to the resource. In this approach, users are required to be signed-in to an applicable account (e.g., associated with a website) and authenticated in order to access any resource. The user desiring to share a resource specifically names the other users and/or groups of users he or she wishes to share the resource with.

However, implementing and maintaining a server-side ACL under this second approach is expensive since detailed access restrictions need to be kept updated either on a per-resource or per-user basis. This second approach also poses scalability issues as a single resource is progressively shared with a growing list of users, and the approach is often increasingly confusing to users, especially as the ACL configuration becomes more complex. For example, suppose a user shares a resource (e.g., a photograph) with a group of other users that he identifies as his "friends" group. Subsequently, the sharing user removes some of the existing users from his "friends" group while adding new users to the group. In such a scenario, the sharing user may be unsure whether the shared resource is still available/accessible to those users which were removed from the "friends" group, and also whether the shared resource is now available/accessible to the new users added to the group. As another example of how the ACL approach is confusing to users, suppose that a user shares a resource (e.g., a document) with a group "X" of other users, where the users in group "X" are granted permission to edit the shared resource. The sharing user also shares the resource with a user "A", but grants user "A" read-only rights with respect to the resource. If user "A" happens to also be in group "X", would user "A" then have editing rights?

In view of the existing approaches to restricted resource sharing described above, embodiments of the present disclosure relate to methods and systems for generating a user-specific resource URI (which may sometimes be referred to herein as an "individualized URI", an "individualized resource link", a "non-resharable resource link", or the like), and granting a user access to a resource through this URI. As will be described in greater detail below, in accordance with at least one embodiment, when an owner/admin of a resource decides to share the resource with a user, the owner/admin may access metadata for the resource (e.g., metadata stored in a database, which may be accessed using, for example, a public identifier for the resource), extract a non-public (e.g., private) passphrase associated with the resource from the metadata, and generate an individualized fingerprint for the resource (e.g., using the private passphrase associated with the resource and a user ID of the user that the resource is being shared with), thereby forming a non-resharable link that may be provided to the user to grant the user access to the resource.

The user-specific resource URI described above has functionality and/or usability specific to the user or group of users for whom the URI was originally created. For example, such individualized URIs may not be usable by any user other than the user with whom the URI is shared. In this manner, the user-specific resource URIs of the present disclosure may be considered non-resharable resource links.

In the ACL-based existing approach (e.g., maintaining a server-side ACL, which is described in detail above), as a user shares a particular resource with more and more other users and, in turn, these other users reshare the resource with even more users, server configuration grows increasingly complex. Accordingly, the present disclosure relates to methods and systems for creating a link that may be provided to a user without the need of retaining any information on the server side of this sharing transaction. The user for whom the link was created and to whom the link was sent may use the link to access a shared resource; however, the link may not be used by any other user to do the same. In accordance with at least one embodiment, no data is created and/or stored as a result of the link being provided to the user (e.g., there is no indication that permission has been granted to the user to access the shared resource, no technical need to create and maintain a "paper trail" for the embodiment to function/operate, etc.). Instead, by creating this customized/ individualized link for the user, the particular user (and only the particular user) is being granted access to the shared resource.

As described above, the methods and systems provided herein obviate the need to maintain ACL configuration on the server side (e.g., it is not necessary to maintain any sharing metadata on the server side), thereby protecting against the possibility of the individualized URIs being forged by an intruder, while preserving the need for the accessing user to be signed-in (e.g., to an applicable account). The methods and systems of the present disclosure are also designed to support various access granularities, such as, for example, access limited in time, access limited with respect to a granted access level, and the like.

In accordance with at least one embodiment of the present disclosure, restricted resource sharing may be accomplished using a non-public (e.g., private) passphrase for shared resources. For example, the passphrase is non-public in the sense that it is not disclosed outside of the server-side logic, and may be used to generate a fingerprint (one-way hash) validating a user's access permission to the particular resource. Further, in accordance with at least one embodiment described herein, the non-public passphrase may be used to validate a user's access granularity with respect to the particular shared resource.

While the specifics of the non-public passphrase may vary depending on the particular implementation, the passphrase should be statically associated with the resource and not publicly disclosed. For example, in accordance with at least one embodiment of the present disclosure, organic and non-public resource metadata may be used instead of a dedicated passphrase, although cryptographic strength properties of this variation will depend on how unique this private metadata is and how difficult/easy it is to guess through trial and error.

Although various embodiments and examples described herein make reference to links that are URIs, it should be understood such reference is in no way intended to limit the scope of the present disclosure. Instead, any one or more of the embodiments or examples described herein may similarly be used to identify various resources by non-URI composite identifiers.

It should also be understood that while various features and examples of the methods and systems of present disclosure are described in the context of sharing resources with "users," numerous other types of sharing (in which a one-way function is involved) may also be used, in addition to, or instead of, sharing with "users." For example, in accordance with one or more embodiments, resources may be shared with a specific IP address or an IP block, with specific certificates signed or unsigned by a domain registrar, and the like.

FIG. 1 illustrates an example system 100 and surrounding network environment for generating and utilizing individualized resource links. For example, in accordance with one or more embodiments described herein, individualized resource links may be exchanged between a front-end server 120 and a back-end server 130 associated with a website (e.g., a video-sharing website, document sharing website, etc.) through which a particular resource may be accessible over a network 110 (e.g., the Internet) by a user 105 with whom the resource has been shared.

The front-end server 120, the back-end server 130, or both, may have access to one or more metadata databases 140. In accordance with at least one embodiment of the present disclosure, the one or more metadata databases 140 may be relational databases (e.g., MySQL database) that store metadata for a resource. The metadata for a resource stored in the metadata database 140 may be accessed, for example, using a public identifier for the resource. For example, a public video ID for a video shared on a video-sharing website may be determined from the URI associated with the video and used to access metadata for the video stored in the metadata database 140.

In accordance with one or more other embodiments, the metadata database 140 may be any of a variety of other databases used for storing resource metadata, in addition to or instead of a relational database. For example, the metadata database 140 may be another type of database that shares some or all of the following properties: (i) the metadata is persistent in a persistent storage (e.g., disk storage); (ii) the metadata is retrievable from the database using just the ID of the resource; and (iii) the data is often replicated.

Figure 2:
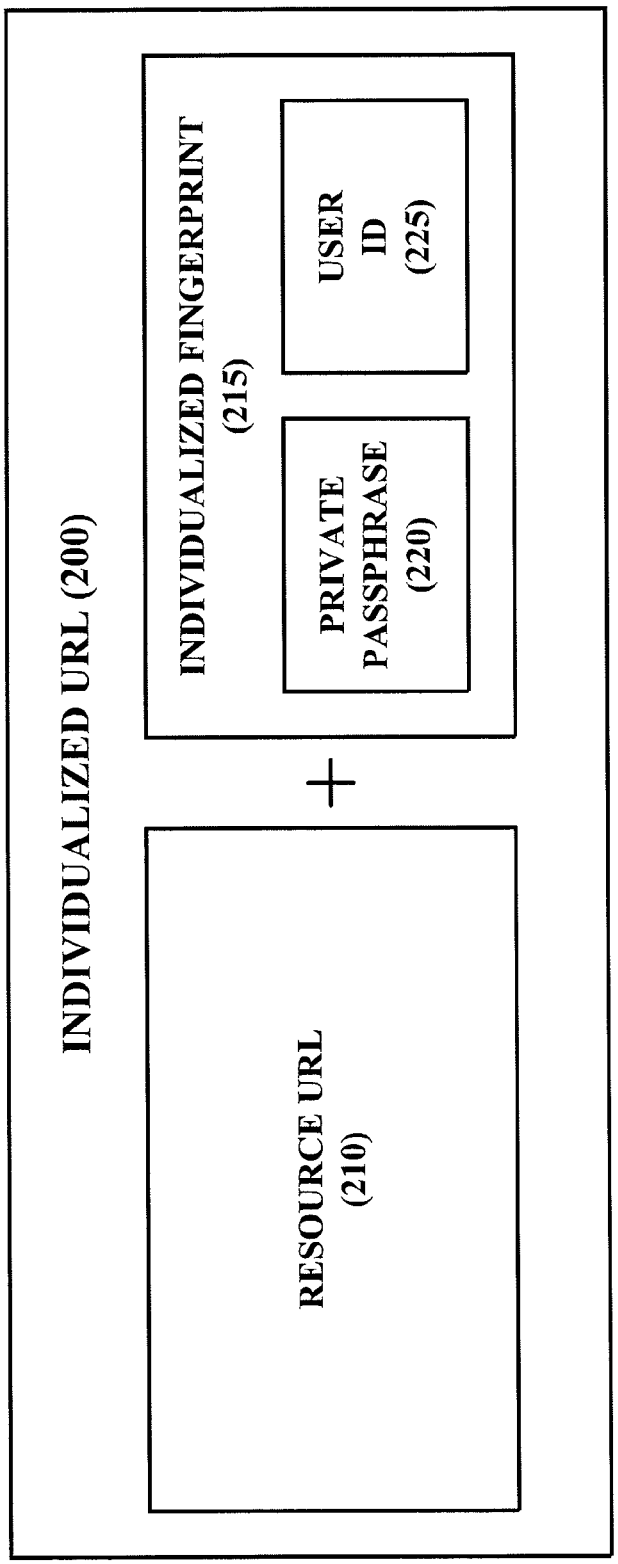
FIG. 2 is a block diagram illustrating example components of an individualized resource link generated for a shared resource according to one or more embodiments described herein.

FIG. 2 illustrates an example structure for an individualized URL 200 generated in accordance with one or more of the embodiments described herein. The individualized URL may be comprised of a resource URL 210 and an individualized fingerprint 215 (e.g., cryptographic hash), where the individualized fingerprint includes a private passphrase 220 and a user ID 225.

In accordance with at least one embodiment described herein, a new key-value pair may be added to the URL for a resource. For example, it may be assumed that a given resource has associated with it:

(i) a unique public identifier (e.g., a public video ID for a video shared on a video-sharing website); and (ii) a private passphrase (e.g., a non-public passphrase in this sense that the passphrase is not known outside of the website, and is not included in any publicly released URLs).

Although it is not essential that the private passphrase (which may also be referred to as "private ID") be unique, it is preferable that the passphrase be substantially unique so that different resources do not often share the same private passphrases. For example, in accordance with at least one embodiment described herein, the private passphrase may be a random number, generated one time per resource and then persisted.

In accordance with one or more other embodiments, the private passphrase or private ID may be comprised of one or more attributes of the resource, where such attributes are substantially immutable and not publicly known. For example, a video uploaded to a video-sharing website may have associated with it an upload timestamp (e.g., in microseconds). Such an upload timestamp may be considered an attribute of the video that is substantially immutable (e.g., unchangeable) and also unknown to the public (e.g., undetectable to the public).

Under the assumptions described above, a non-resharable link to the resource may be generated by augmenting the resource's public ID in the URL with a fingerprint (e.g., cryptographic hash) of the user ID of the user with whom the resource is shared and the private passphrase for the resource. For example, in accordance with one or more embodiments described herein, an individualized fingerprint may be generated for a hypothetical user "U" and a hypothetical resource "R" as follows:

(1) consider a pair of <private-passphrase-for-R, user-id-for-U>; and (2) compute a cryptographically strong fingerprint of the pair in (1).

It should be noted that any of a number of cryptographic fingerprint functions known to those skilled in the art may be used to compute the fingerprint in (2) described above. For example, in accordance with at least one embodiment, the cryptographic hash function SHA3-256 may be used to compute the fingerprint in (2). In addition, the private passphrase should come first in the fingerprinting sequence (before the user ID) to avoid any cryptology exploits that rely on the known prefix of the clear-text.

Figure 3:
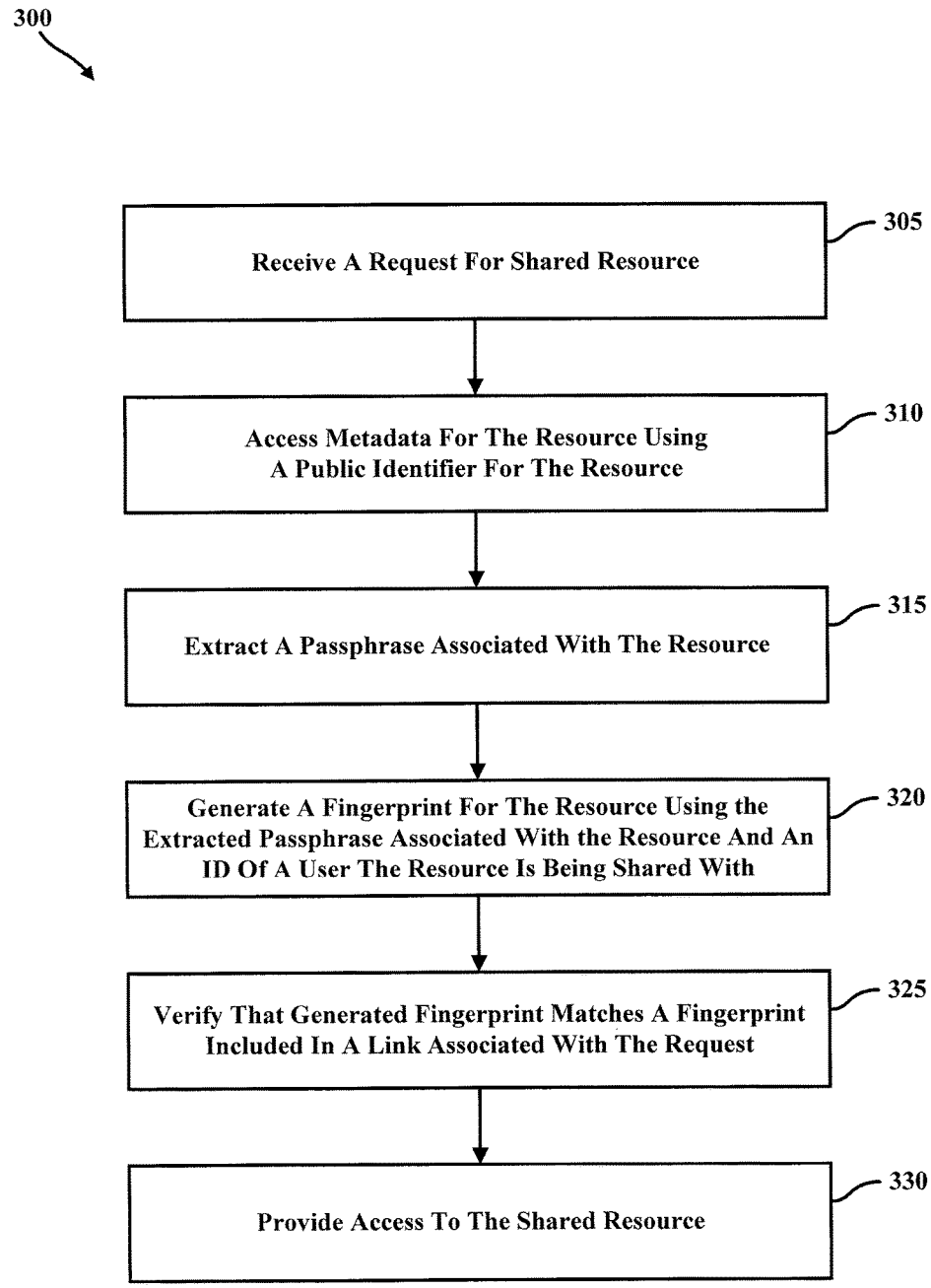
FIG. 3 is a flowchart illustrating an example method for generating and interpreting individualized resource links for shared resources according to one or more embodiments described herein.

FIG. 3 illustrates an example process 300 for accepting an individualized URL generated in the manner described above. In accordance with one or more embodiments of the present disclosure, the server implementation for individualized URLs may proceed as follows.

At block 305, a request for a shared resource may be received. For example, a request for a shared resource (e.g., a video) may be received at a backend server associated with a video-sharing website.

At block 310, metadata for the shared resource may be accessed using a public identifier for the resource. As one example, resource metadata is commonly stored in a database (e.g., MySQL database) and retrieved from such database using the resource ID. For example, a public video ID for a video shared on a video-sharing website may be determined from the URI associated with the resource and used to access metadata for the resource stored in a corresponding relational database.

In addition to relational databases (e.g., MySQL database), a variety of other databases may also be used for storing resource metadata, most of which share the following properties: (i) the metadata is persistent in a persistent storage (e.g., disk storage); (ii) the metadata is retrievable from the database using just the ID of the resource; and (iii) the data is often replicated.

The metadata for a given resource may be represented in a structured form, such as an object with a multitude of specific fields. In accordance with at least one embodiment of the present disclosure, one of such fields could be the private passphrase described above. For example, in relational databases (e.g., MySQL database) the "data row" read from the database table using an ID represents a number of individual columns. The private passphrase of the present disclosure could be one of these columns.

At block 315, a private passphrase associated with the resource may be extracted from the metadata accessed (e.g., retrieved from an associated database in which the metadata may be stored) at block 310.

At block 320, an individualized fingerprint for the shared resource may be generated using the private passphrase associated with the resource (extracted at block 315) and a user ID of a user that the resource is being shared with. For example, in accordance with at least one embodiment, an individualized fingerprint for the shared resource may be generated in the manner described above.

At block 325, it may be verified (e.g., determined) that the fingerprint generated at block 320 matches a fingerprint included in a link (e.g., an individualized URI) associated with the request received at block 305.

At block 330, access to the shared resource may be provided based on the verification that the fingerprint generated at block 325 matches the fingerprint specified in the individualized URI associated with the request for the resource received at block 305.

In accordance with one or more embodiments of the present disclosure, the example methods and systems provided (e.g., process 300 for generating and interpreting individualized URIs) may be utilized for more granular sharing purposes. For example, in many web applications sharing access is granular (e.g., "read only", "comment only", "edit", "owner", etc.). In other applications, access may be granted to a user for a limited time, such as, for example, "until 12 PM EST on Jun. 20, 2014", "for the next eight hours", etc. These and other features and enhancements may be supported, for example, by explicitly specifying the granularity option and incorporating this option into the fingerprint.

As described in accordance with one or more of the embodiments above, resource sharing may be accomplished using permalinks, which are only usable by users with whom a given resource is shared. As such, the permalinks are safe in the sense that, even if intercepted by an intruder (e.g., a user with who the resource is not intended or desired to be shared), the links cannot be used to access the shared resource.

The methods and systems of the present disclosure provide a simplified scheme of restricted sharing of resources on public networks (e.g., the Internet), without the need to maintain any access control configuration for the resource being shared. It should also be noted that access to a shared resource may be revoked from all users with whom the resource has been shared by changing the resource's private ID.

It should also be understood by those skilled in the art that the methods and systems of the present disclosure may be extended from sharing a resource with an individual user to sharing a resource with a group of users, in a rather straightforward manner. For example, in such a scenario involving the sharing of a resource with a group of users, in generating the URI for the resource, the user ID may be replaced with a group ID for fingerprinting (e.g., create a fingerprint of <private passphrase, group ID>). In addition, the determination of whether to allow a particular user access to a shared resource (where the resource may or may not have been shared with a group of users) may be made, for example, as follows: (i) determine whether to allow access to the resource in accordance with the methods described above (e.g., in the case of an individual user) with the user ID of the particular user; if successful, the URL was created for the particular user and access is allowed. If the determination in (i) is unsuccessful, identify all groups that the particular user is a member of and, for each identified group, attempt to fingerprint <private passphrase, group ID>. When it is determined that one such fingerprint matches, allow access to the resource to this particular user. It should also be understood that one or more other techniques may also be used to extend the sharing of a resource with an individual user to sharing the resource with a group of users, in addition to or instead of the example technique described above.

Figure 4:
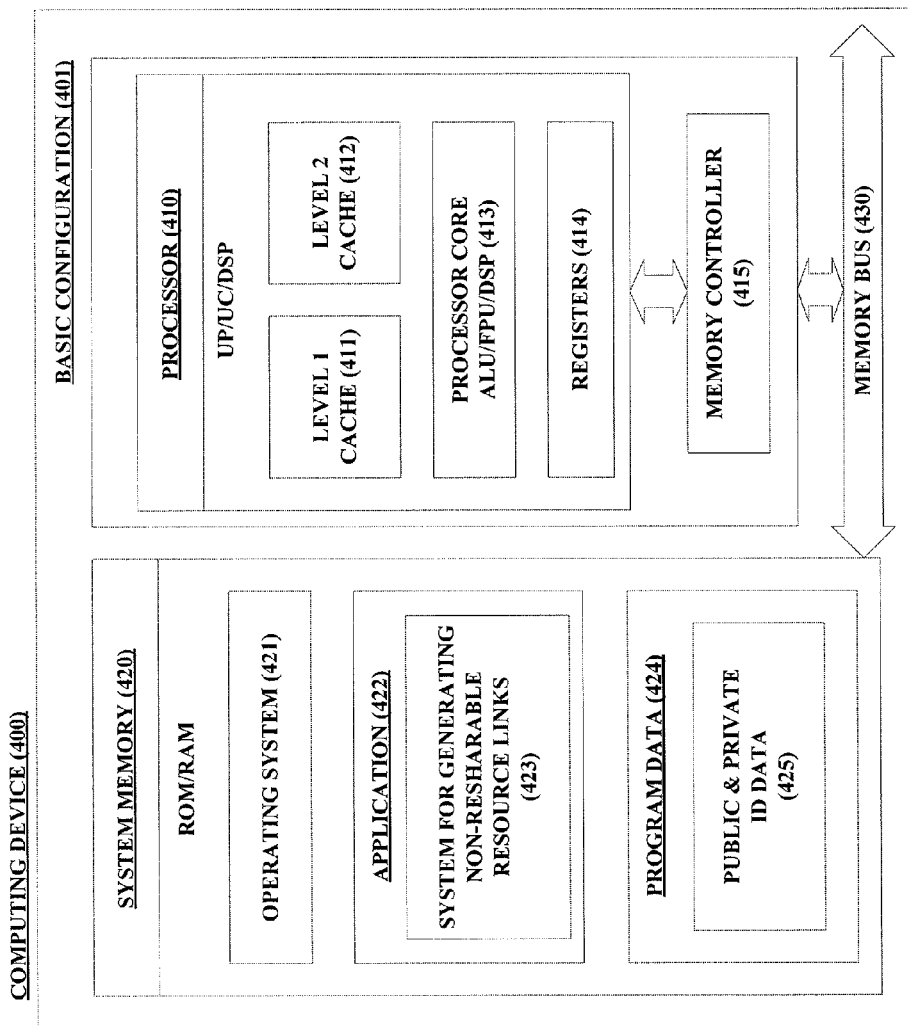
FIG. 4 is a block diagram illustrating an example computing device arranged for generating and interpreting individualized resource links for shared resources according to one or more embodiments described herein.

FIG. 4 is a high-level block diagram of an exemplary computer (400) that is arranged for generating and interpreting individualized resource links in accordance with one or more embodiments described herein. In a very basic configuration (401), the computing device (400) typically includes one or more processors (410) and system memory (420). A memory bus (430) can be used for communicating between the processor (410) and the system memory (420).

Depending on the desired configuration, the processor (410) can be of any type including but not limited to a microprocessor (µP), a microcontroller (µC), a digital signal processor (DSP), or any combination thereof. The processor (410) can include one more levels of caching, such as a level one cache (411) and a level two cache (412), a processor core (413), and registers (414). The processor core (413) can include an arithmetic logic unit (ALU), a floating point unit (FPU), a digital signal processing core (DSP Core), or any combination thereof. A memory controller (416) can also be used with the processor (410), or in some implementations the memory controller (415) can be an internal part of the processor (410).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). The application (422) may include a system for generating non-resharable resource links (423). In accordance with at least one embodiment of the present disclosure, the system for generating non-resharable resource links (423) eliminates the need to maintain (e.g., store) any data on the server side, thus protecting against possible forgery of the individualized URIs, while preserving the need for the accessing user to be authenticated (e.g., signed-in to an applicable account). The system for generating non-resharable resource links (423) may also be configured to support various access granularities, such as, for example, access limited in time, access limited with respect to a granted access level, and the like.

Program Data (424) may include storing instructions that, when executed by the one or more processing devices, implement a system (423) and method for generating non-resharable resource links. Additionally, in accordance with at least one embodiment, program data (424) may include public and private ID data (425), which may relate to a public identifier associated with a shared resource, and/or a user ID of a user with whom the shared resource has been shared. In accordance with at least some embodiments, the application (422) can be arranged to operate with program data (424) on an operating system (421).

The computing device (400) can have additional features or functionality, and additional interfaces to facilitate communications between the basic configuration (401) and any required devices and interfaces.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the device (400).

The computing device (400) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (400) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It should also be noted that in situations in which the systems and methods described herein may collect personal information about users, or may make use of personal information, the users may be provided with an opportunity to control whether programs or features associated with the systems and/or methods collect user information (e.g., information about a user's preferences). In addition, certain data may be treated in one or more ways before it is stored or used, so that personally identifiable information is removed. For example, a user's identity may be treated so that no personally identifiable information can be determined for the user. Thus, the user may have control over how information is collected about the user and used by a server.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
  generating a non-resharable link to a shared resource, the generating comprising augmenting a public identifier for the shared resource with a first fingerprint, the first fingerprint generated from a private passphrase and a recipient user identifier (ID);
  providing the non-resharable link;
  receiving a request for the shared resource, the request associated with a requestor user ID and the non-resharable link specifying the first fingerprint;

accessing metadata for the shared resource using the public identifier for the shared resource;

extracting, from the metadata, a passphrase associated with the shared resource, wherein the passphrase is generated and persisted in the metadata, and undetectable to users who do not have access to the shared resource;

generating a second fingerprint for the shared resource using the requestor user ID and the extracted passphrase associated with the shared resource;

verifying that the second fingerprint matches the first fingerprint included in the non-resharable link associated with the request for the shared resource; and upon verifying the second fingerprint matches the first fingerprint included in the non-resharable link associated with the request for the shared resource, providing access to the shared resource.

2. The method of claim 1, wherein the passphrase is a random number generated once for the shared resource.

3. The method of claim 1, wherein the passphrase is based on one or more attributes of the shared resource.

4. The method of claim 1, wherein providing access to the shared resource includes providing access for a specified amount of time.

5. The method of claim 1, wherein providing access to the shared resource includes granting editing rights with respect to the shared resource.

6. The method of claim 1, wherein the passphrase is altered and a third fingerprint for the shared resource is generated using the altered passphrase; and determining that the third fingerprint fails to match the first fingerprint included in the non-resharable link associated with the request for the shared resource; and upon determining the third fingerprint fails to match the first fingerprint included in the non-resharable link associated with the request for the shared resource, denying access to the shared resource.

7. The method of claim 1, wherein the request associated with a requestor user ID and the non-resharable link comprises a request for access to the shared resource through the non-resharable link by a user having the requestor user ID.

8. A system comprising:

one or more processors; and a non-transitory computer-readable medium coupled to said one or more processors having instructions stored thereon that, when executed by said one or more processors, cause said one or more processors to perform operations comprising:

generating a non-resharable link to a shared resource, the generating comprising augmenting a public identifier for the shared resource with a first fingerprint, the first fingerprint generated from a private passphrase and a recipient user identifier (ID);

providing the non-resharable link;

receiving a request for the shared resource, the request associated with a requestor user ID and the non-resharable link specifying the first fingerprint;

accessing metadata for the shared resource using the public identifier for the shared resource;

extracting, from the metadata, a passphrase associated with the shared resource, wherein the passphrase is generated and persisted in the metadata, and undetectable to users who do not have access to the shared resource;

generating a second fingerprint for the shared resource using the requestor user ID and the extracted passphrase associated with the shared resource;

verifying that the second fingerprint matches the first fingerprint included in the non-resharable link associated with the request for the shared resource; and upon verifying the second fingerprint matches the first fingerprint included in the non-resharable link associated with the request for the shared resource, providing access to the shared resource.

9. The system of claim 8, wherein the passphrase is a random number generated once for the shared resource.

10. The system of claim 8, wherein the passphrase is based on one or more attributes of the shared resource.

11. The system of claim 8, wherein providing access to the shared resource includes providing access for a specified amount of time.

12. The system of claim 8, wherein providing access to the shared resource includes granting editing rights with respect to the shared resource.

13. The system of claim 8, wherein the passphrase is altered and a third fingerprint for the shared resource is generated using the altered passphrase; and determining that the third fingerprint fails to match the first fingerprint included in the non-resharable link associated with the request for the shared resource; and upon determining the third fingerprint fails to match the first fingerprint included in the non-resharable link associated with the request for the shared resource, denying access to the shared resource.

14. One or more non-transitory computer readable media storing computer-executable instructions that, when executed by one or more processors, causes the one or more processors to perform operations comprising:

generating a non-resharable link to a shared resource, the generating comprising augmenting a public identifier for the shared resource with a first fingerprint, the first fingerprint generated from a private passphrase and a recipient user identifier (ID);

providing the non-resharable link;

receiving a request for a shared resource, the request associated with a requestor user ID and the non-resharable link specifying the first fingerprint;

accessing metadata for the shared resource using the public identifier for the shared resource;

extracting, from the metadata, a passphrase associated with the shared resource, wherein the passphrase is generated and persisted in the metadata, and undetectable to users who do not have access to the shared resource;

generating a second fingerprint for the shared resource using the requestor user ID and the extracted passphrase associated with the shared resource;

verifying that the second fingerprint matches the first fingerprint included in the non-resharable link associated with the request for the shared resource; and upon verifying the second fingerprint matches the first fingerprint included in the non-resharable link associated with the request for the shared resource, providing access to the shared resource.

15. The one or more non-transitory computer readable media of claim 14, wherein the passphrase is a random number generated once for the shared resource.

16. The one or more non-transitory computer readable media of claim 14, wherein the passphrase is based on one or more attributes of the shared resource.

17. The one or more non-transitory computer readable media of claim 14, wherein providing access to the shared resource includes providing access for a specified amount of time.

18. The one or more non-transitory computer readable media of claim 14, wherein providing access to the shared resource includes granting editing rights with respect to the shared resource.

19. The one or more non-transitory computer readable media of claim 14, wherein the passphrase is altered and a third fingerprint for the shared resource is generated using the altered passphrase; and determining that the third fingerprint fails to match the first fingerprint included in the non-resharable link associated with the request for the shared resource; and upon determining the third fingerprint fails to match the first fingerprint included in the non-resharable link associated with the request for the shared resource, denying access to the shared resource.

\* \* \* \* \*